United States Patent [19]

Nakano et al.

[11] 4,283,671

[45] Aug. 11, 1981

[54] AUTOMATIC RESIDUAL PHASE ERROR COMPENSATION CIRCUIT FOR A DIGITAL SERVO CONTROL SYSTEM

[75] Inventors: Kenji Nakano, Yokohama; Tadahiko Nakamura, Kanagawa, both of Japan

[73] Assignee: Sony Corporation, Tokyo, Japan

[21] Appl. No.: 70,517

[22] Filed: Aug. 28, 1979

[30] Foreign Application Priority Data

Aug. 30, 1978 [JP] Japan ................................. 53-104900

[51] Int. Cl.³ .............................................. G05B 1/01
[52] U.S. Cl. .................................... 318/608; 318/314; 318/632
[58] Field of Search ............... 318/314, 608, 632, 634; 360/77

[56] References Cited

U.S. PATENT DOCUMENTS

| | | | |
|---|---|---|---|
| 3,654,479 | 4/1972 | Catherin | 318/314 X |
| 3,778,693 | 12/1973 | Korteling | 318/314 |
| 3,872,369 | 3/1975 | Rich | 318/608 X |
| 4,061,950 | 12/1977 | Kayanuma | 318/314 |
| 4,177,411 | 12/1979 | Takaoka | 318/314 |

Primary Examiner—B. Dobeck
Attorney, Agent, or Firm—Lewis H. Eslinger; Alvin Sinderbrand

[57] ABSTRACT

A digital servo control system for controlling a drive motor accumulates speed and phase error numbers and produces a pulse width modulated signal in response thereto. Phase errors are measured by counting pulses of a clock signal between the arrival of a position signal related to a rotational position of the drive motor and the arrival of a reference signal. An automatic residual error compensating circuit controls a delay applied to the position signal in accordance with residual phase error to minimize the same.

11 Claims, 57 Drawing Figures

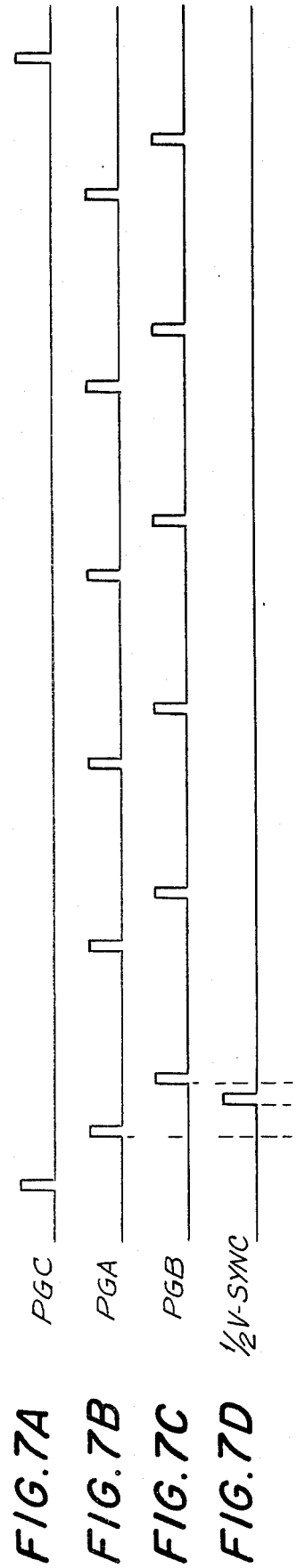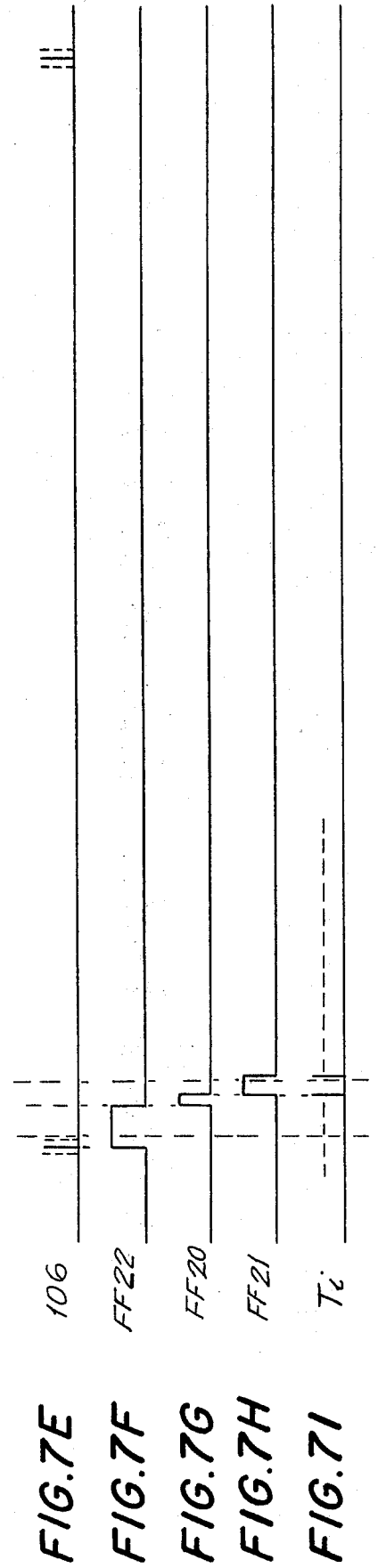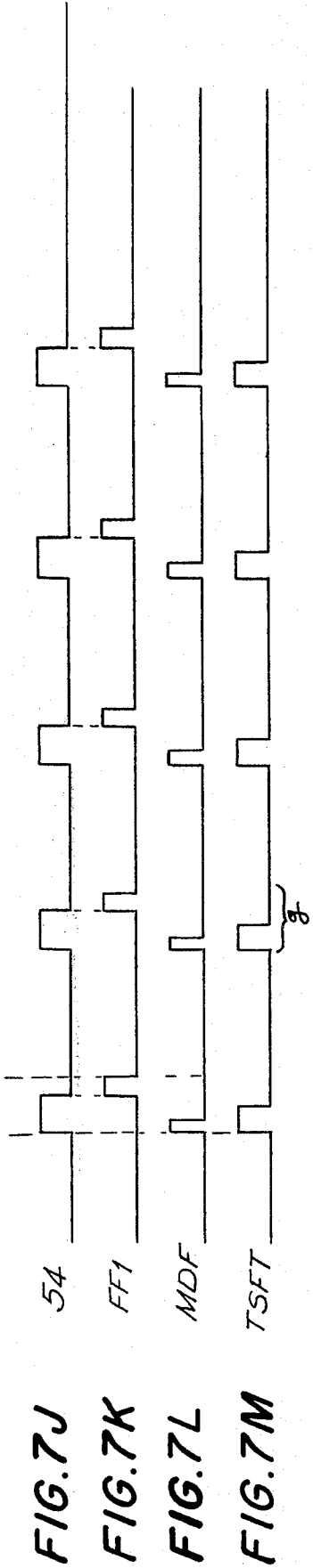

FIG.8A  PGA
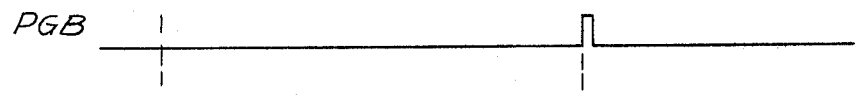
FIG.8B  PGB
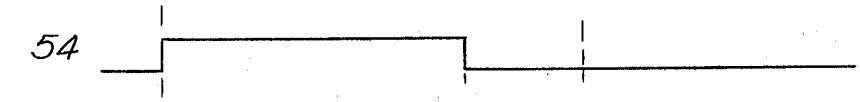
FIG.8C  54
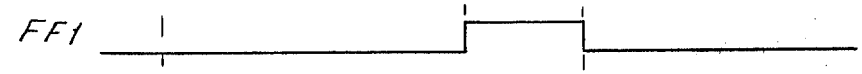
FIG.8D  FF1
FIG.8E  MDF
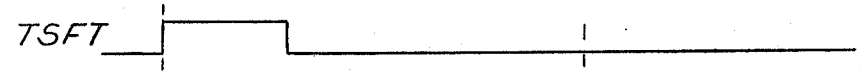
FIG.8F  TSFT
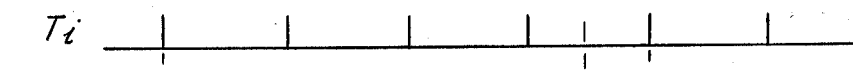
FIG.8G  Ti
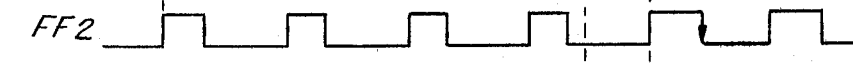
FIG.8H  FF2
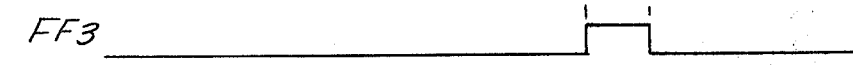
FIG.8I  FF3
FIG.8J  FF10
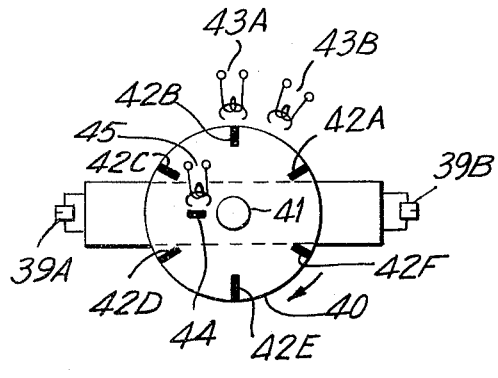
FIG.9
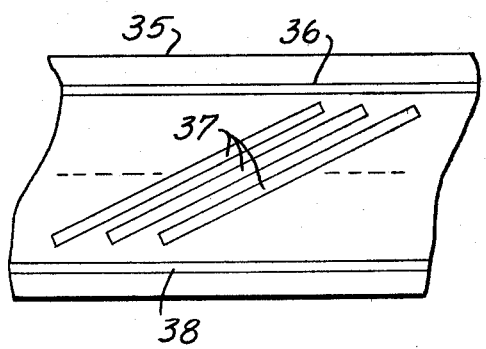
FIG.10

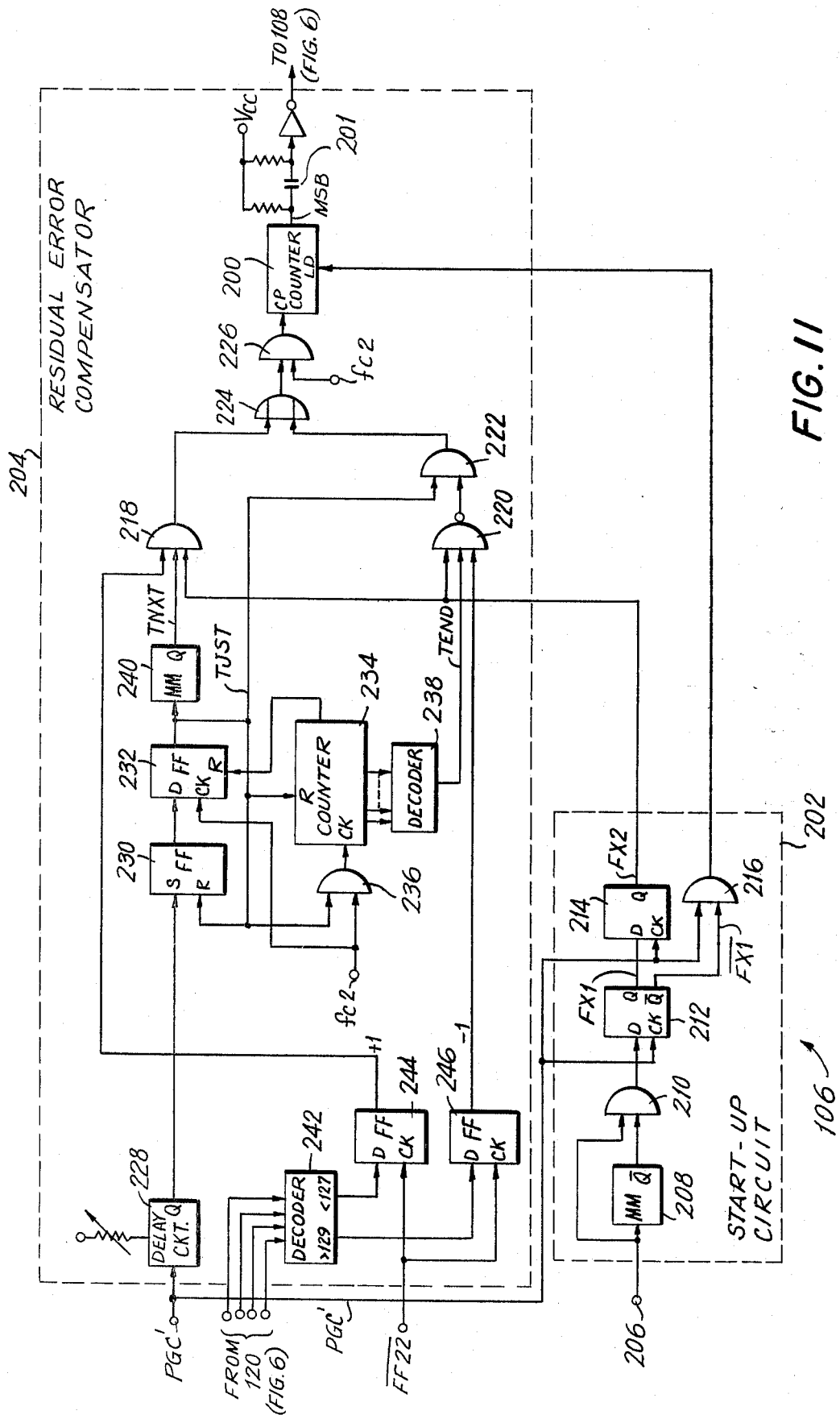

FIG.12A  PGC'
FIG.12B  PWR ON 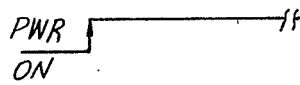
FIG.12C  MMQ̄ 208 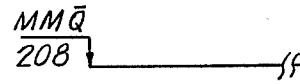

FIG.12E  FX1 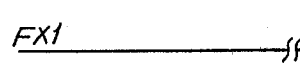
FIG.12F  FX2 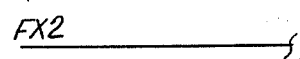
FIG.13A  PGC' 
FIG.13B  Q 228 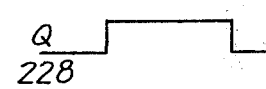
FIG.13C  TJST 
FIG.13D  TEND 
FIG.13E  TNXT 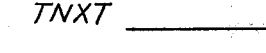
FIG.13F  MSB 200 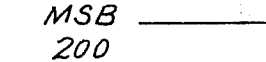

AUTOMATIC RESIDUAL PHASE ERROR COMPENSATION CIRCUIT FOR A DIGITAL SERVO CONTROL SYSTEM

REFERENCE TO A RELATED APPLICATION

The present application is related to U.S. patent application Ser. No. 6,756 filed Jan. 26, 1979 by the same inventive entity as the present application and having a common assignee therewith, the disclosure of which is herein incorporated by reference.

BACKGROUND OF THE INVENTION

1. Field of the Invention

This invention relates generally to digital control circuits which may be employed to control the speed and/or phase of rotation of a head or other element in a video tape recorder.

2. Description of the Prior Art

The prior art contains examples of analog servo control circuits for control of the speed and/or phase of a motor. Typically, the analog devices of the prior art trigger the generation of a ramp signal upon the occurrence of a predetermined event, such as the passage of a magnetic pole piece attached to the rotating element, whose speed and/or phase is to be controlled, past a stationary sensing or pickup coil to provide a sensed signal. A reference signal, which occurs after the sensed signal, is employed to sample and hold the value of the ramp signal existing at the occurrence of the reference signal. Since the ramp signal changes at a known rate, the amplitude of the ramp signal at any given time is proportional to the time after its initiation. The sampled and held analog value which is proportional to the time between the sensed signal and the reference signal is employed as a drive signal for a motor.

Such analog devices depend on the resistance-capacitance time constant of circuit components employed for generation of the ramp signal, and typically employ capacitance storage elements to perform the sample and hold function. Due to the resistance and capacitance tolerances of discrete resistors and capacitors, manual adjustment is required during the manufacture and maintenance of such devices, thus adding to manufacture and maintenance costs. In addition, the servo characteristics of analog circuits employing capacitance and resistance tend to vary due to the temperature coefficient and aging of such elements. Further, a system employing analog techniques cannot practically be made as an integrated circuit. Even when maximum integration is achieved, it is still necessary to externally connect discrete resistors and capacitors since capacitors in particular are not compatible with integrated circuit manufacture and the range of resistance values attainable is not acceptable. Consequently, manufacturing costs are increased and the temperature and aging variations noted in the preceding are not overcome. Furthermore, the need for assembly steps to install and adjust for such discrete externally connected parts makes integrated circuit design with such external components meaningless. Furthermore, if such an integrated circuit with discrete components were produced, the number of pins for connection to and from the integrated circuit chips is increased and this increase, combined with the size of the discrete components themselves, interferes with the desired high density circuit packaging.

Digital servo systems have been provided for controlling rotation of a rotary member, for example, by an electric motor. However, due to long-term changes in electric motors, electronic parts and the temperature characteristics thereof, a residual error may develop in a digital servo system, particularly in the phase control portion. Although theoretically this error could be minimized by making the servo loop gain infinite, such a solution is not practical.

OBJECTS AND SUMMARY OF THE INVENTION

Accordingly, it is an object of the invention to provide a novel servo control system utilizing digital techniques.

Another object of this invention is to provide a digital servo control system which is adaptable to fabrication as an integrated circuit.

Another object of this invention is to provide a digital servo control system in which residual phase errors are automatically compensated.

According to an aspect of the invention, a servo control apparatus for controlling rotation of a rotary member is provided comprising means for driving the rotary member, means for generating an angular position signal related to an angular position of the rotary member, means for generating a reference signal related to a desired angular position of the rotary member, means for accumulating a digital number related to a time between the angular position signal and the reference signal, means for controlling the means for driving in accordance with the digital number whereby phase control of the rotary member is achieved, and means for changing a timing of one of the angular position signal and the reference signal in response to the digital number whereby the digital number is changed toward a predetermined value.

The above, and other objects, features and advantages of the present invention will become apparent from the following description which is to be read in conjunction with the accompanying drawings in which like reference numerals designate the same elements.

BRIEF DESCRIPTION OF THE DRAWINGS

FIGS. 3A-3G are waveforms to which reference will be made in explaining the general principle of operation of a speed control digital servo control circuit;

FIGS. 4A-4B are waveforms to which reference will be made in describing the principle of a phase control digital servo control circuit;

FIGS. 7A-7M are waveforms to which reference will be made in describing operation of the apparatus shown in FIGS. 5 and 6;

FIGS. 8A-8J are enlarged views of portions of FIGS. 7J-7M bracketed with the letter g on FIG. 7M, as well as additional significant signals to which reference will be made in describing the operation of the apparatus shown in FIGS. 5 and 6;

FIG. 9 is a schematic plan view of a part of a video tape recorder having rotary heads and means for generating reference signals so as to be suitable for use with the apparatus shown in FIGS. 5 and 6;

FIG. 10 is a plan view of a length of magnetic tape having represented thereon various tracks in which video, audio and control signals are recorded by means of a video tape recorder;

FIG. 11 is a detailed block diagram of an automatic residual error compensating circuit according to an embodiment of the present invention which is suitable for use in the phase detection circuit of FIG. 6;

FIGS. 12A-12F are waveforms to which reference will be made in describing the start-up sequence of the automatic residual error compensating circuit of FIG. 11; and FIGS. 13A-13F are waveforms to which reference will be made in describing the normal operation of the automatic residual error compensating circuit of FIG. 11.

DETAILED DESCRIPTION OF THE PREFERRED EMBODIMENT

Figure 1:
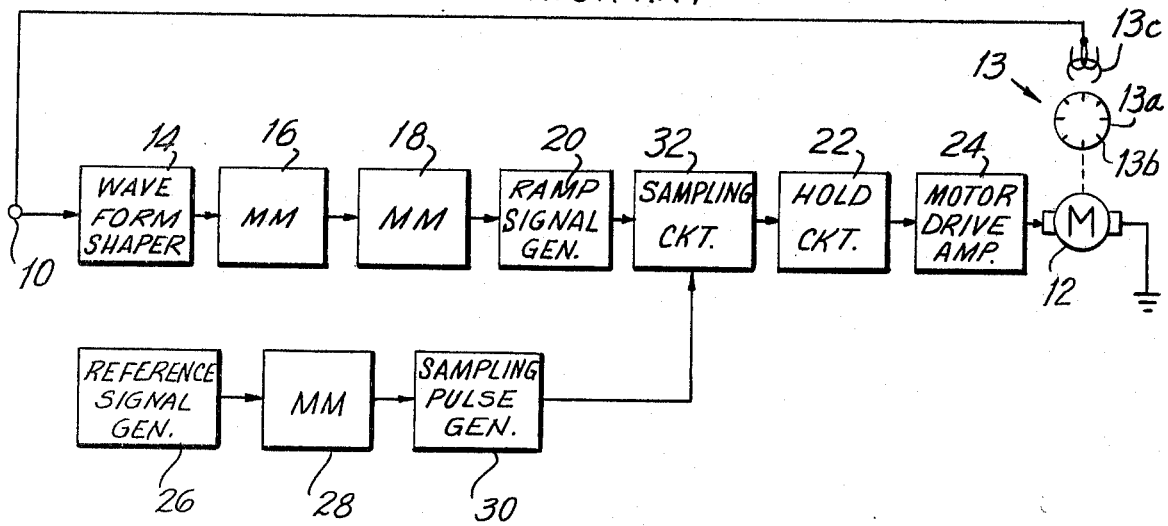
FIG. 1 is a block diagram of a servo control circuit according to the prior art.
Figure 2A:
FIGS. 2A-2G are waveforms to which reference will be made in explaining the operation of the prior art circuit of FIG. 1.

Referring initially to FIG. 1, a servo control circuit according to the prior art is shown in which the drive signal to a motor 12 is controlled to provide speed and/or phase control of the motor rotation. A rotational position signal generator 13 has, for example, a disc 13a mechanically coupled to rotate with the shaft of motor 12 which, for example, drives the heads of a video tape recorder. One or more magnetic pole pieces 13b may be affixed to disc 13a to rotate therewith past a pickup coil 13c. As each pole piece 13b moves past pickup coil 13c, a pulse $P_G$ (FIG. 2A) is induced in the pickup coil 13c, and such pulse $P_G$ is applied through an input 10 of the servo control circuit to a waveform shaper 14. Of course, other types of rotational position signal generators, such as, electro-optical, electro-static, and electro-mechanical devices or the like, may be substituted for the described electromagnetic generator 13.

Figure 2B:
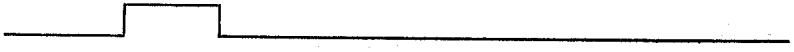
Figure 2C:

A delay monostable multivibrator 16 receives the output of waveform shaper 14 and generates an output pulse (FIG. 2B) which terminates a predetermined time later. A gating monostable multivibrator 18 is triggered ON by the negative-going trailing edge of the output of monostable multivibrator 16. The pulse output of gating monostable multivibrator 18 is coupled to the input of a ramp signal generator 20. When the output of gating monostable multibrator 18 is present at the input of ramp signal generator 20, the latter generates a rising ramp signal (FIG. 2C) whose amplitude at any point is proportional to the time thereto from the beginning of the signal from gating monostable multivibrator 18.

Figure 2D:
Figure 2E:
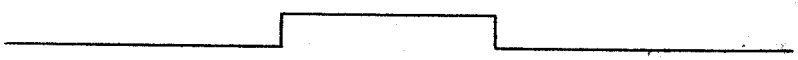
Figure 2F:
Figure 2G:
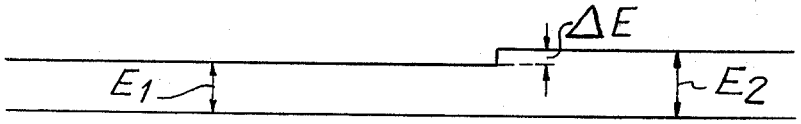

A reference signal generator 26 which can be any convenient source of a reference signal, such as, for example, a crystal oscillator, a line power frequency source, a vertical synchronizing signal source or a control signal which has been recorded on a magnetic tape, applies a pulse reference signal (FIG. 2D) to the input of a delay monostable multivibrator 28. In the example of the prior art shown on FIG. 1, the output of reference signal generator 26 is assumed to be a vertical synchronizing pulse. The delay monostable multivibrator 28 is triggered into producing a pulse output of fixed duration (FIG. 2E) by the negative-going leading edge of the signal from reference signal generator 26. The fixed delay pulse output of delay monostable multivibrator 28 is applied to the input of a sampling pulse generator 30 which thereupon applies a short sampling pulse (FIG. 2F) to a respective input of a sampling circuit 32. The sampling circuit 32, upon receiving the sampling pulse (FIG. 2F) samples the magnitude of the ramp signal (FIG. 2C) then appearing at its other input and applies the sampled magnitude to a hold circuit 22 which thereupon stores the sampled magnitude of the ramp signal until a new value or magnitude is received. The analog value stored in hold circuit 22 is applied to an input of a motor drive amplifier 24 so as to be amplified therein, and the resulting amplified drive signal (FIG. 2G) is applied to motor 12 for driving the latter.

In the example shown, prior to the occurrence of the sampling pulse (FIG. 2F), the voltage fed to the motor as a result of a signal stored in hold circuit 22 during the previous cycle has the value $E_1$. Upon the occurrence of the sampling pulse, a new voltage $E_2$, having an amplitude $\Delta E$ greater than $E_1$, is applied to motor 12 to increase the motor speed. Conversely, the voltage from amplifier 24 may actuate a brake which properly decreases or increases the retarding force on the motor in the proportion to its amplitude and thereby maintains the motor speed and phase in predetermined relationship to the reference signal from reference signal generator 26.

Figure 3C:
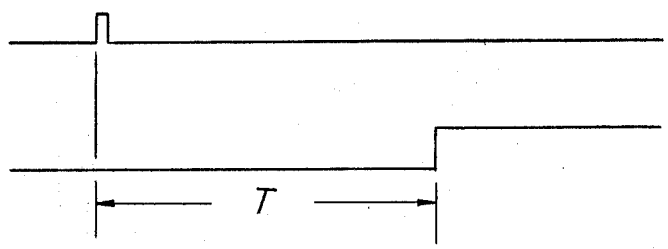

The principle of an example of a digital servo control circuit which may be used with the present invention will now be described with reference to FIGS. 3A-3G. In general, the purpose of such a digital servo control circuit is to generate control signals which maintain constant the time T between a first event, such as the generation of a pulse signal $P_G$ (FIG. 3A), and the occurrence of a second event, such as the positive going edge of a reference signal (FIG. 3B). The pulse signal $P_G$ of FIG. 3A may be, for example, the output of pulse generator 13 (FIG. 1), and the event producing the positive going leading edge of the signal in FIG. 3B may be, for example, the occurrence of a pulse from a crystal oscillator, a control signal reproduced from a magnetic tape, a line frequency pulse, or a vertical synchronizing signal.

Figure 3D:
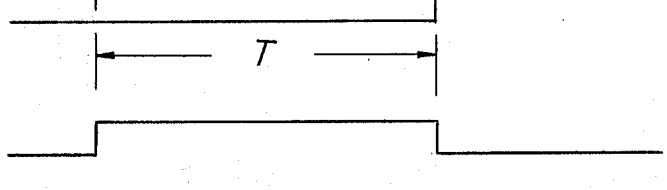
Figure 3E:
Figure 3F:
Figure 3G:
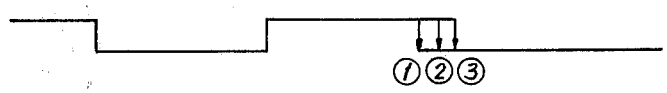

In order to avoid the necessity for a ramp signal generator and a sample and hold circuit to generate a motor control signal, the example digital servo system employs pulse width modulation to produce a signal which contains more or less energy in accordance with the coincidence, or lack of coincidence of the positive going edge of the reference signal in FIG. 3B with the expiration of the period T measured from the rotational pulse signal $P_G$. The signals in FIGS. 3A and 3B may be employed to define the leading and trailing edges of a pulse signal, such as shown in FIG. 3C, and which defines one control cycle of the digital servo control circuit. During the control cycle of FIG. 3C a large number of clock pulses, such as are shown on FIG. 3D, are counted in a counter. FIGS. 3E, 3F and 3G respectively show the outputs of a first stage $CT_1$, a second stage $CT_2$ and an Nth stage $CT_N$ of a counter. Although other relationships are possible, it is assumed that, when the time from rotational pulse signal $P_G$ (FIG. 3A) to the positive going edge of the reference signal (FIG. 3B) is precisely equal to the period T, the Nth stage of the counter accomplishes one full cycle beginning in coincidence with the pulse signal $P_G$ of FIG. 3A and ending at (2) on FIG. 3G in coincidence with the positive going leading edge of the reference signal or event shown on FIG. 3B. In the example illustrated on FIG. 3G, this results in a pulse signal which has equal low and high parts, that is, a duty cycle, or ON time of 50 percent. The average energy in such signal is midway between extreme low and high values.

If the period from pulse $P_G$ to the positive going edge of the reference signal is shorter than the time T and terminates at the point (1) on FIG. 3G, the resulting pulse signal from the Nth stage of the counter contains less energy than previously indicated. Conversely, if the period from pulse $P_G$ to the positive going edge of the reference signal is longer than the time period T, and therefore terminates at point (3) on FIG. 3G, this produces a pulse width modulated signal having greater average energy than the signal with a 50 percent duty cycle. The variation of the average energy of the pulse width modulated signal from that for the 50 percent duty cycle is then used to either increase or decrease the speed being controlled, for example, the speed of rotation of the rotary heads in a video tape recorder (VTR).

Figure 4B:
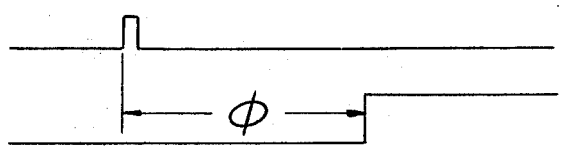

The relationship between the pulse signal $P_G$ (FIG. 4A) and the positive going leading edge of a reference signal (FIG. 4B) is further defined by a phase angle $\phi$. Whether controlling the speed or the phase relationship, the digital servo control circuit periodically adjusts its output to return the phase angle $\phi$ to its predetermined value.

The generation of signals to be employed in an exemplary digital servo control circuit suitable for use with the present invention will now be described with reference to FIGS. 9 and 10.

A conventional magnetic video tape 35 (FIG. 10) may have recorder thereon in a well known manner a plurality of skewed video tracks 37 as well as an audio track 36 parallel to one longitudinal edge of the tape and a control track 38 along the other longitudinal edge of the tape. Although not necessary to the practice of the invention, each of the tracks 37 may conventionally contain the video information for a single field. The control track 38 may have control signals recorded therein at spaced apart locations corresponding to the tracks 37 in response to the vertical synchronizing pulses of the video signal are recorded in the tracks 37.

The skewed video tracks 37 are recorded and/or reproduced by first and second video heads 39A and 39B (FIG. 9) which are rotated about a rotary shaft 41 in a well known manner. A disc 40 may be affixed to the shaft 41 to rotate with video heads 39A and 39B. A plurality, suitably six, of magnetic pole pieces 42A–42F are spaced apart at equal angles about the perimeter of the disc 40. A first pickup coil 43A and a second pickup coil 43B are angularly spaced apart, suitably 18 degrees apart, adjacent the perimeter of disc 40. As one of the magnetic pole pieces, for example pole piece 42B, moves in the clockwise direction indicated by the arrow past pickup coils 43A and 43B, a signal PGA is first generated in pickup coil 43A and then a second signal PGB is generated in coil 43B. The time between the signals PGA and PGB from pickup coils 43A and 43B is, of course, dependent upon the speed at which the video heads are rotating. In the embodiment shown, six output pulses or signals are generated by each of pickup coils 43A and 43B during each revolution of disc 40.

Another magnetic pole piece 44 is disposed on disc 40, and a pickup coil 45 is fixedly located so that, as magnetic pole piece 44 rotates therepast once per revolution of disc 40, pickup coil 45 generates a pulse signal PGC. Conventionally, the magnetic pole piece 44 is aligned with one of the video heads, in the example shown video head 39A. Thus, the single pulse output PGC from pickup coil 45 bears a fixed relationship to the rotational position of video heads 39A and 39B. Although not necessary for the functioning of the invention, pickup coils 45, 43A and 43B are arranged so that the pulse PGC from pickup coil 45 precedes a pulse or signal PGA from pickup coil 43A which, in turn, precedes a pulse or signal PGB from pickup coil 43B. Following these three signals, an additional five pairs of PGA and PGB signals are generated by pickup coils 43A and 43B, respectively, before the next PGC signal is generated by pickup coil 45. The foregoing relationships between pulse signals PGC, PGA and PGB in the preferred embodiment are shown in FIGS. 7A–7C.

Figure 5:
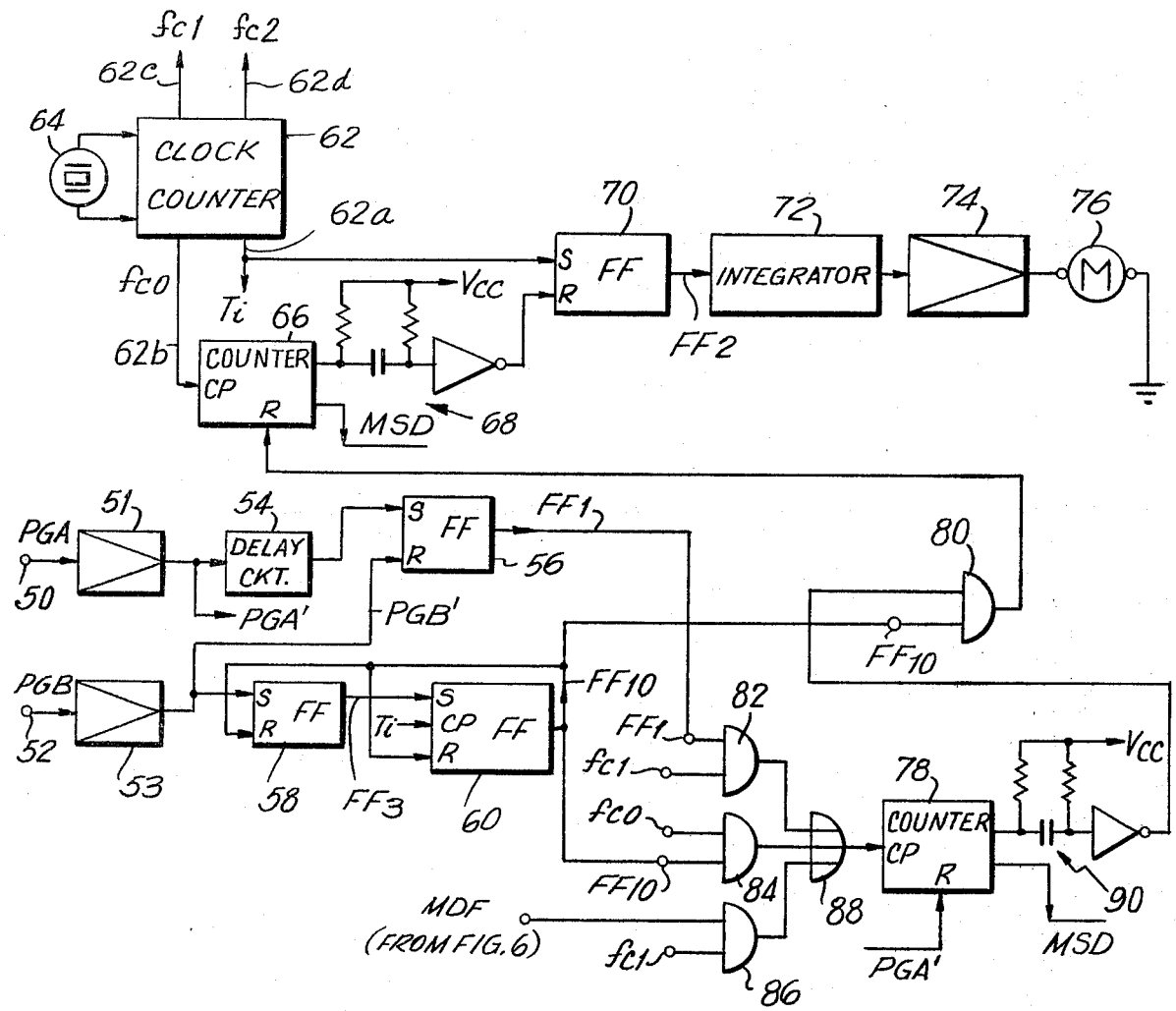
FIG. 5 is a block diagram of a digital servo control apparatus including a speed error detecting circuit suitable for use with an automatic residual error compensating circuit of the present invention.
Figure 6:
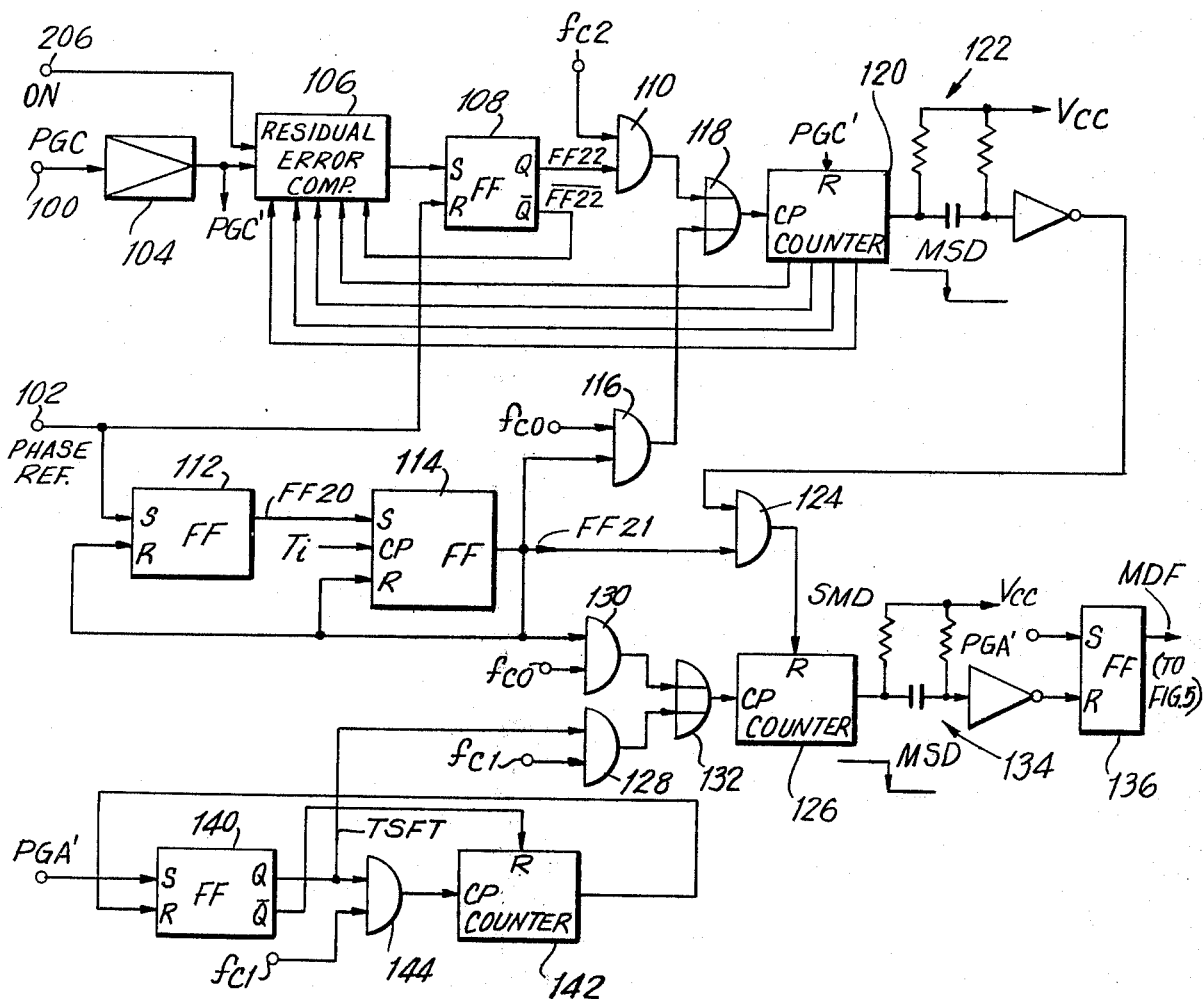
FIG. 6 is a block diagram of a phase error detection circuit, employed with the digital servo control apparatus of FIG. 5, which contains an automatic residual error compensating circuit according to an embodiment of the present invention.

Referring now to FIGS. 5 and 6, it will be noted that the speed and phase control functions are performed in response to outputs 62a–62d from a counter 62 controlled by a quartz crystal 64 having a suitable frequency, for example, of 3.58 MHz. The outputs of counter 62, which acts as a timing clock, are as follows:

| OUTPUT LINE | SIGNAL | FREQUENCY |
|---|---|---|
| 62a | $T_i$ (narrow pulses) | 3.5 KHz ($f_{CO}/1024$) |
| 62b | $f_{CO}$ | 3.58 MHz |
| 62c | $f_{C1}$ | 895 KHz ($f_{CO}/4$) |
| 62d | $f_{C2}$ | 112 KHz ($f_{CO}/32$) |

The narrow 3.5 KHz interval timing pulses $T_i$ are applied to a set input S of a flip-flop 70. Each interval timing pulse $T_i$ triggers the set output $FF_2$ of flip-flop 70 into the high condition. Flip-flop 70 is reset at a time in each cycle which is dependent on the speed and phase errors of a motor 76 for driving heads 39A and 39B. Thus, the output $FF_2$ of flip-flop 70 is pulse width modulated.

The 3.58 MHz clock pulses $f_{CO}$ are applied to a clock input CP of a 1024 bit counter 66. When the most significant digit (MSD) of 1024 bit counter 66 goes from high to low, the negative-going edge of this transition is differentiated in a differentiator 68 and the resulting pulse signal is applied to the reset input R of flip-flop 70. This terminates the high condition output $FF_2$ from flip-flop 70.

The time following an interval timing pulse $T_i$ at which flip-flop 70 is reset depends on the content or count of 1024 bit counter 66 at the occurrence of the interval timing pulse $T_i$. For example, if the content of 1024 bit counter 66 is zero at the instant an interval timing pulse $T_i$ occurs, the most significant digit (MSD) of 1024 bit counter 66 returns to zero 1024 cycles of clock signal $f_{CO}$ thereafter which is coincident with the occurrence of the next interval timing pulse $T_i$. Thus, flip-flop 70 remains in its set condition throughout the cycle and its output signal $FF_2$ has a duty cycle or ratio of ON time to OFF time, of 100 percent and contains its maximum energy. Furthermore, since exactly 1024 pulses of clock signal $f_{CO}$ occur between adjacent interval timing pulses $T_i$, unless an external event intervenes, 1024 bit counter 66 is returned to exactly the same condition, that is, zero count in this example, at each occurrence of each interval timing pulse $T_i$.

In contrast to the preceding, if the content of 1024 bit counter 66 is other than zero, for example, a count of 512, at the occurrence of an interval timing pulse $T_i$, a reset signal is applied to the reset input R of flip-flop 70 512 cycles of clock signal $f_{CO}$ after interval timing pulse $T_i$, and the high condition of output $FF_2$ is terminated at that time. The next interval timing pulse $T_i$ occurs 512 cycles of clock signal $f_{CO}$ after the termination of the high condition of output $FF_2$ and again sets flip-flop 70 to the high condition. In this example, the output $FF_2$ is repetitively high for 512 cycles of $f_{CO}$ and low for 512 cycles of $f_{CO}$ to result in a 50 percent duty cycle and an average energy of half that in the preceding example. Any duty cycle from zero to 100 percent can be achieved for output $FF_2$ by arranging for counts between 1023 and zero to exist in 1024 bit counter 66 at the occurrence of interval timing pulses $T_i$.

The 1024 bit counter 66 is periodically reset, in a manner to be described, so that the number contained in it at the occurrence of each interval timing pulse $T_i$ is related to speed and phase errors.

From the preceding description, it is evident that the duty cycle of output signal $FF_2$ can have any one of 1024 discrete values. Following each reset of 1024 bit counter 66 to a different value, the duty cycle of output signal $FF_2$ jumps to a corresponding different value and, if no measures are taken to prevent it, jerky control of motor 76 would result. In order to avoid jerky control of motor 76, the pulse width modulated output signal $FF_2$ from flip-flop 70 is applied to an integrator 72. Integrator 72 generates a slowly changing output signal which is proportional to the average energy in the output signal $FF_2$ and which smooths the change from one control value to another. This integrated signal is amplified by a motor drive amplifier 74 and applied to motor 76.

FIG. 5 is further seen to illustrate means for periodically applying a reset signal to a reset input R of 1024 bit counter 66, which reset signal is properly timed with respect to interval timing pulses $T_i$ so that an appropriate number will be contained in 1024 bit counter 66 at all later occurrences of interval timing pulses $T_i$ until the next reset signal is applied to the reset input R of 1024 bit counter 66. Specifically, in FIG. 5, such periodic reset signals are generated in response to errors in the rotational speed of video heads 39A and 39B (FIG. 9). Speed control is, of course, only required in the case of a dc motor. In an ac motor is substituted for motor 76, speed control is inherently provided by such motor and the speed control provided by the embodiment of FIG. 5 may be omitted. However, phase control to be described hereinafter would still be required with an ac motor.

Speed control is exercised in the apparatus of FIG. 5 by using the time difference between the occurrences of the two signals PGA and PGB to produce a properly timed reset signal for application to the reset input R of 1024 bit counter 66. The signal PGA (FIG. 7B) is shown to be applied through an input terminal 50 to an amplifier 51. The amplified output PGA' of amplifier 51 is applied to a delay circuit 54 and elsewhere in the apparatus as will be explained. Delay circuit 54 produces an output pulse (FIG. 7J) the trailing edge of which, when applied to a set input S of a flip-flop 56, triggers flip-flop 56 into its set condition to produce a high output on speed error gating signal $FF_1$ (FIG. 7K).

Signal PGB (FIG. 7C) is applied through an input terminal 52 to an amplifier 53. The amplified output PGB' of amplifier 53 is connected to the reset input R of flip-flop 56. The positive going leading edge of the signal PGB' is effective to reset flip-flop 56 and return speed error gating signal $FF_1$ to the low condition. As is clear from the foregoing description, the length of the high condition of speed error gating signal $FF_1$ is determined by the time between signals PGA and PGB. The delay circuit 54 is not a necessary part of the invention but is convenient to permit interlacing of the speed and phase error signals as will be explained.

The speed error gating signal $FF_1$ is applied to one input of an AND gate 82 which, at a second input, receives the 895 KHz signal $f_{C1}$. Thus, a number of 895 KHz pulses is gated through AND gate 82 in proportion to the difference in arrival times of signals PGA and PGB. A 1024 bit counter 78 is reset upon the occurrence of the PGA signal by the amplified PGA' signal applied to its reset input R. The 895 KHz pulses gated through AND gate 82 by signal $FF_1$ are applied through OR gate 88 to a clock input CP of 1024 bit counter 78. Thus, at the end of speed error gating signal $FF_1$, 1024 bit counter 78 has stored therein a number or content which is proportional to the difference in arrival times of signals PGA and PGB.

The amplified signal PGB' is applied to the set input S of a flip-flop 58, and the output $FF_3$ of the latter is applied to the set input S of a flip-flop 60. The output $FF_{10}$ of flip-flop 60 is applied to the reset inputs R of flip-flops 58 and 60, and interval pulses $T_i$ are applied to the clock input CP of flip-flop 60. The set output $FF_3$ of flip-flop 58 is triggered ON by the leading edge of the signal PGB' (FIGS. 8B and 8I), and thereby enables the set input of flip-flop 60. Upon the next occurrence of an interval timing pulse $T_i$ (FIG. 8G) at the clock input CP of flip-flop 60, flip-flop 60 is triggered into its set condition and output signal $FF_{10}$ becomes high. This condition persists until the next arriving interval timing pulse $T_i$ at the clock input CP of flip-flop 60, at which time flip-flop 60 is reset. The negative going trailing edge of output signal $FF_{10}$, in being fed back to the reset input of flip-flop 58, resets flip-flop 58 in preparation for the next cycle. As is evident from the preceding description, the output signal $FF_{10}$ begins and ends with the first and second interval timing pulses $T_i$, respectively, following the occurrence of the PGB signal.

The timing-interval-wide output signal $FF_{10}$ is applied to one input of an AND gate 84 and one input of an AND gate 80. The second input of AND gate 84 receives the 3.58 MHz clock signal $f_{CO}$. Thus, beginning at one interval timing pulse $T_i$ and ending at the next occurring interval timing pulse $T_i$, the 3.58 MHz clock signal $f_{CO}$ is gated through OR gate 88 to the clock input CP of 1024 bit counter 78. The 1024 bit counter 78 completes exactly one cycle during this timing interval and produces a negative going MSD signal at a time which is dependent upon the number previously stored in 1024 bit counter 78 during the occurrence of speed error gating signal $FF_1$ from flip-flop 56. It will be recalled that the length of speed error gating signal $FF_1$ is dependent upon the time between the occurrences of signals PGA and PGB. Consequently, the time of occurrence of the MSD output of 1024 bit counter 78 after the interval timing pulse $T_i$ is likewise dependent upon the time between signals PGA and PGB. The greater the count stored in 1024 bit counter 78 during the occurrence of the speed error gating signal $FF_1$, the sooner after the beginning of the output signal $FF_{10}$ will the MSD signal be produced. The negative going edge of the MSD signal is differentiated in a differentiator 90 and is applied through AND gate 80, which is enabled by output signal $FF_{10}$, to the reset input R of 1024 bit counter 66. Thus, 1024 bit counter 66 is reset to zero following the occurrence of an interval timing pulse $T_i$ at a time which is dependent upon the difference in arrival time of the two signals PGA and PGB.

It will be noted from FIGS. 8A, 8B and 8G that a plurality of interval timing pulses $T_i$ occur between successive resets of 1024 bit counter 66. However, as previously explained, since exactly 1024 cycles of clock signal $f_{CO}$ occur between interval timing pulses $T_i$, once 1024 bit counter 66 is reset following a signal PGB, the time of occurrence of the MSD output of 1024 bit counter 66, and the consequent resetting of flip-flop 70, remains constant from cycle to cycle. This is illustrated in FIGS. 8H and 8J where, during output signal $FF_{10}$ (FIG. 8J) flip-flop 70 is reset as indicated by the arrow on FIG. 8H and the relative ON and OFF times of the pulse width modulated signal $FF_2$ continues as thus established until the next adjustment time following a signal PGB.

In addition to the correction achieved in the manner previously described in response to speed errors, a number is also stored in 1024 bit counter 78 which is dependent on phase errors between the angular position of the motor shaft and a reference angular position. A phase error gating signal MDF is applied to one input of an AND gate 86, and the 895 KHz clock signal $f_{C1}$ is applied to the second input of AND gate 86. A number of cycles of the 895 KHz signal $f_{C1}$ depending upon the length of the phase error gating signal MDF are gated through AND gate 86 and OR gate 88 to the clock input CP of 1024 bit counter 78. As will be explained, the phase error gating signal MDF applied to AND gate 86 occurs at a different time from the speed error gating signal $FF_1$ applied to AND gate 82. Thus the clock pulses gated by the two gating signals MDF and $FF_1$ are cumulative in 1024 bit counter 78 so as to determin the content or count in the latter, and both contribute to the establishment of the duty cycle of the motor drive signal.

Referring now to FIG. 6, it will be seen that, for generation of the phase error gating signal MDF, the signal PGC (FIG. 7A), occurring once per revolution of the recording heads (FIG. 9), is applied through an input terminal 100 to an amplifier 104 and the resulting amplified signal PGC' is applied to the input of an automatic residual error compensating circuit 106. Automatic residual error compensating circuit 106 is provided to permit compensating for fixed delays in signal PGC with respect to a reference phase and for residual phase errors due to aging of the motor and electronic components, temperature and other causes. Automatic residual error compensating circuit 106, which will be more fully described hereinafter, produces a pulse output (FIG. 7E) which is applied to the set input of a flip-flop 108 so that the latter is set. For purposes of simplifying the initial description, it can be assumed that automatic residual error compensating circuit 106 provides a fixed delay before triggering flip-flop 108 into the set condition.

A phase reference signal, for example, a vertical synchronizing pulse or a corresponding control signal recorded on control track 38 (FIG. 10) is applied through an input terminal 102 to the reset input R of flip-flop 108. The set output $FF_{22}$ of flip-flop 108 (FIG. 7F) consequently has a duration which is dependent upon the relationship between the arrival times of the signal PGC at input terminal 100 and the reference signal at input terminal 102. This difference between arrival times is proportional to the error in phase between the actual angular position of the recording heads and their desired angular position. The set output $FF_{22}$ of flip-flop 108 is applied to one input of an AND gate 110 for enabling the latter, and the 112 KHz clock signal $f_{C2}$ is applied to a second input of AND gate 110. Thus, a number of cycles of clock signal $f_{C2}$ gated through AND gate 110 by the set output $FF_{22}$ of flip-flop 108 is proportional to the phase error.

A 256 bit counter 120 is reset upon the occurrence of PGC by the application of the amplified signal PGC' to its reset input R. The 112 KHz pulses gated through AND gate 110 by the phase error signal are applied through an OR gate 118 to the clock input CP of 256 bit counter 120. Thus, following the arrival of each pulse PGC, a number of 112 KHz pulses are counted in 256 bit counter 120 in proportion to the magnitude of the phase error. This number is stored once per revolution of the recording heads but is used several times during a revolution as will be explained below.

A flip-flop 112 receives the phase reference signal from input terminal 102 at its set input S. The set output $FF_{20}$ of flip-flop 112 is applied to the set input S of a flip-flop 114 which has its set output $FF_{21}$ fed back to the reset inputs R of flip-flops 112 and 114. Following the application of the phase reference signal to set input S of flip-flop 112, the output signal $FF_{20}$ from the latter enables the set input of flip-flop 114. The next occurring interval timing pulse $T_i$ applied to a clock input CP of flip-flop 114 triggers flip-flop 114 into its set condition. This produces a high level or condition of the set output $FF_{21}$ of flip-flop 114 which endures until the instant of the next occurring interval timing pulse $T_i$, at which time set output $FF_{21}$ goes low. Thus, the signal $FF_{21}$ (FIG. 7H) endures for one timing interval between an adjacent pair of interval timing pulses $T_i$ (FIG. 7I) immediately following the occurrence of a phase reference signal (FIG. 7D).

The signal $FF_{21}$ is applied in parallel to one input of each of AND gates 116, 124 and 130, and second inputs of AND gates 116 and 130 receive the 3.58 MHz clock signal $f_{CO}$. The 3.58 MHz pulses are gated through AND gate 116 for one timing interval and applied through OR gate 118 to clock input CP of 256 bit counter 120. A total of 1024 cycles of clock signal $f_{CO}$ are fed to 256 bit counter 120 during the timing interval between adjacent interval timing pulses $T_i$. This number of cycles of clock signal $f_{CO}$ advances 256 bit counter through four complete cycles ending on the same count as originally contained therein. Simultaneously, a 256 bit counter 126 receives 1024 cycles of clock signal $f_{CO}$ gated through AND gate 130 by signal $FF_{21}$ and then applied through OR gate 132 to a clock input CP of counter 126. Each time the most significant digit (MSD) of 256 bit counter 120 returns to zero, a differentiating circuit 122 applies a positive pulse to the second input of AND gate 124. Since AND gate 124 is enabled by the signal $FF_{21}$ at this time, the resulting gated output of AND gate 124 provides a reset signal SMD which is applied to the reset input R of 256 bit counter 126. Since 256 bit counter 126 is reset by signal SMD at its reset input R each time 256 bit counter 120 completes a cycle during the existence of the signal $FF_{21}$, at the termination of the signal $FF_{21}$, both of the 256 bit counters 120 and 126 will contain the same number when they come to rest after receiving 1024 cycles of clock signal $f_{CO}$, which number or content represents the phase error signal originally inserted into 256 bit counter 120.

A circuit consisting of a flip-flop 140, an AND gate 144, a 256 bit counter 142 and an AND gate 128 is effective to produce 256 pulses of the 895 KHz clock signal $f_{C1}$ following the occurrence of each signal PGA (that is, six times per revolution of the recording heads). More particularly, the amplified signal PGA' is shown to be applied to the set input S of flip-flop 140. The signal TSFT from the set output Q of flip-flop 140 (FIG. 8F) is applied to one input of AND gate 144 and to one input of AND gate 128. The 895 KHz clock signal $f_{C1}$ is connected to second inputs of AND gate 144 and AND gate 128. The output of 256 bit counter 142 is fed back to the reset input R of flip-flop 140, and the reset output $\overline{Q}$ of flip-flop 140 is applied to the reset input R of 256 bit counter 142. Upon the occurrence of amplified signal PGA', flip-flop 140 is set, and the resulting signal TSFT from output Q of flip-flop 140 enables AND gates 128 and 144 for the gating therethrough of the 895 KHz clock signal $f_{C1}$. 256 bit counter 142, which is initially reset, begins counting the pulses of clock signal $f_{C1}$ at its clock input CP. Upon reaching a count of 256, the output of 256 bit counter 142 undergoes a transition which is effective at the reset input R of flip-flop 140 to reset the latter. The removal from AND gates 128 and 144 of the enable signal TSFT (FIG. 7M) from the set output Q of flip-flop 140 terminates the gating of the 895 KHz clock signal $f_{C1}$ through AND gates 128 and 144. This occurs after the gating of exactly 256 cycles. In addition, the positive signal then occurring at the reset output $\overline{Q}$ of flip-flop 140 is effective, at the reset input R of 256 bit counter 142, to reset the latter in preparation for the next arriving signal PGA'.

The signal PGA' is also applied to the set input S of a flip-flop 136. The set output of flip-flop 136 is the phase error gating signal MDF (FIGS. 7L and 8E) which is fed to one input of AND gate 86 in FIG. 5. As the 256 pulses are gated into the clock input CP of the 256 bit or buffer counter 126, counter 126 goes through one complete cycle and returns to a standstill at the same count proportional to the phase error that it contained before the 256 pulses were gated into it. The negative going most significant digit (MSD) output from 256 bit counter 126 occurs within its 256 bit cycle at a point determined by the count originally located therein. This count, as previously described, is determined by the phase error originally stored in 256 bit counter 120 and transferred into 256 bit counter 126 during the occurrence of the signal $FF_{21}$. Consequently, the time at which the MSD output of counter 126 occurs is proportional to the phase error. The MSD signal from 256 bit counter 126 is differentiated in a differentiator 134 and the resulting negative pulse is applied to the reset input R of flip-flop 136 to terminate the phase error gating signal MDF.

Referring again to FIG. 5, it will be seen that phase error gating signal MDF is applied to one input of AND gate 86 and, thereby, enables the gating therethrough of the 895 KHz clock signal $f_{C1}$ and the application of this signal through OR gate 88 to the clock input CP of 1024 bit counter 78. It should be noted that the phase error gating signal MDF (FIG. 7L) is generated six times per revolution of the recording head, that is, following each occurrence of the signal PGA, whereas the phase error is detected only one time per revolution of the recording head, that is, following the signal PGC (FIG. 7A). However, since 256 bit counter 126 (FIG. 6) is driven through exactly 256 clock pulses following the receipt of each signal PGA, 256 bit counter 126 is always returned to its starting count at the end of the 256 input pulses. Consequently, until a new phase error is detected and transferred into 256 bit counter 126, the phase error gating signal MDF from flip-flop 136 repeats the same timing in each of its cycles.

Referring now to FIGS. 8A-8J, it will be seen that the phase error gating signal MDF (FIG. 8E) which loads the phase error into 1024 bit counter 78 occurs during the delay pulse output from delay circuit 54 (FIG. 8C) fed to the set input S of flip-flop 56. Consequently, the storage of pulses in 1024 bit counter 78 in proportion to the phase error is completed before the end of the delay pulse from delay circuit 54 (FIG. 8C). After the end of the delay pulse from delay circuit 54, the speed error gating signal $FF_1$ (FIG. 8D) enables the further storage of pulses in 1024 bit counter 78 in proportion to the speed error. Consequently, pulses proportional to both the phase error and speed error are entered into 1024 bit counter 78 six times during each revolution of the recording heads (FIG. 9) and a reset signal from 1024 bit counter 78, after being differentiated in differentiator 90, is applied to the reset input R of 1024 bit counter 66 following each occurrence of the signal PGB. Thus 1024 bit counter 66 is reset at a time which reflects both the phase and speed errors as described. The recurring MSD outputs of 1024 bit counter 66 which are differentiated in differentiator 68 and applied to the reset input R of flip-flop 70, are also responsive to both phase and speed errors. Therefore, the average energy in the output signal $FF_2$ of flip-flop 70 is varied according to both phase and speed errors in the direction tending to cause the average output signal from integrator 72, when amplified by amplifier 74, to be effective to apply a signal to motor 76 which adjusts the motor torque so as to eliminate the phase and speed errors.

Automatic residual error compensating circuit 106 does not, in fact, apply a fixed delay to signal PGC', as was assumed for purposes of the preceding description. Instead, the delay provided by automatic residual delay compensating circuit 106 is varied in a manner hereinafter described to compensate for residual phase errors.

The starting time of the delayed output of automatic residual error compensating circuit 106 is varied, as indicated by the dashed locations of the pulse signal in FIG. 7E, according to the content, or numbers stored, in 256-bit counter 120 at the end of the phase error storing cycle. The content or conditions of individual stages in 256-bit counter 120 are fed back in parallel to automatic residual error compensating circuit 106. The value fed back is sampled upon the occurrence of reset output $\overline{FF22}$ of flip-flop 108 which is also fed back to automatic residual error compensating circuit 106. This dynamic change in the timing of the output of automatic residual error compensating circuit 106 adjusts the nominal value of the phase error signal stored in 256-bit counter 120 following each counting cycle thereof to overcome residual phase errors.

Referring now to FIG. 11, there is shown a detailed block diagram of automatic residual error compensating circuit 106 according to an embodiment of the present invention suitable for use in the exemplary digital servo circuit shown in FIGS. 5 and 6. Briefly, the output of automatic residual error compensating circuit 106 is produced by the most significant bit (MSB) of a 256-bit counter 200 returning to zero. This signal is differentiated in a differentiator 201 to produce the narrow pulse shown in FIG. 7E. The time at which 256-bit counter 200 returns to zero is advanced or retarded from cycle to cycle depending on the condition of 256-bit counter 120 (FIG. 6). If 256-bit counter 120 contains a count of 128 plus or minus 1 count (that is from 127 to 129), 256-bit counter 200 is driven through a complete cycle by exactly 256 cycles of clock signal $f_{C2}$ and produces an output signal at the same time in each cycle relative to the receipt of signal PGC'. If the content of 256-bit counter 120 is greater than 129, one count is subtracted from the content of 256-bit counter 200 in the subsequent cycle to change the point at which 256-bit counter 120 begins storing pulses until the content in 256-bit counter 120 at the end of the phase error storing period, defined by set output FF22 of flip-flop 108, is decreased to 129 or less. If the content of 256-bit counter 120 is less than 127 at the end of output FF22 from flip-flop 108, one count per cycle is added to 256-bit counter 200 following the next arrival of signal PGC' until the number in 256-bit counter 120 attains a value of 127 or more at the end of the counter period.

In this way, residual phase error in the rotational position of the rotary member is removed by permitting the width of the phase contribution to the pulse width modulated pulse train to change by one clock pulse width following a phase measurement operation. The residual phase error is then transferred to 256-bit counter 200, thus permitting 256-bit counter 120 to resume operation at a count of 128 plus or minus 1 count.

In greater detail now, automatic residual error compensating circuit 106 consists of a start-up circuit 202 and a residual error compensator 204. Start-up circuit 202 is provided to inhibit operation of residual error compensator 204 when the equipment is first turned on until a sufficient time has elapsed for stable servo operation to be obtained.

A voltage is applied at an input terminal 206 and remains thus applied as long as the equipment is turned ON. This voltage is applied to an input of a monostable multivibrator 208 and an AND gate 210. A reset output Q of monostable multivibrator 208 is applied to a second input of AND gate 210. The output of AND gate 210 is applied to the D input of a D-type flip-flop 212. The set output $FX_1$ of D-type flip-flop 212 is applied to the D input of a second D-type flip-flop 214. The reset output $\overline{FX}_1$ of D-type flip-flop 212 is applied to an input of an AND gate 216. The signal PGC' is applied to the clock inputs CK of D-type flip-flops 212 and 214 and to a second input of AND gate 216. The set output $FX_2$ of D-type flip-flop 214 is applied to one input of an AND gate 218 and a NAND gate 220. The output of AND gate 216 is applied to the load input LD of 256-bit counter 200. 256-bit counter 200 is arranged to be preset to its middle value, namely 128, when it receives a high signal or "1" at its load input LD from AND gate 216.

During the start-up sequence, the signal $FX_2$ applied to AND gate 218 keeps this AND gate inhibited throughout the start-up sequence. The signal $FX_2$ applied to NAND gate 220 ensures that the output of NAND gate 220 remains high, or binary "1" throughout the start-up sequence. The high from NAND gate 220 is applied to an input of an AND gate 222. The output of AND gate 222 is applied through an OR gate 224 to an input of an AND gate 226. AND gate 226 receives the 112 KHz clock signal $f_{C2}$ at its second input. During the time that AND gate 226 is enabled at one of its inputs through OR gate 224, the 112 KHz clock signals $f_{C2}$ are applied to the clock input CP of 256-bit counter 200. As will be more fully explained hereinafter, the second input of AND gate 222 is enabled for a time period which exactly corresponds to the arrival time of 256-clock pulses $f_{C2}$ at AND gate 226. Thus, 256-bit counter 200 is cycled through a complete cycle and returns to rest containing the same value which it had at the beginning. Midway through the cycling of 256-bit counter 200 the most significant bit of 256-bit counter 200 returns to zero and produces an output which is differentiated in differentiator 201 to apply a trigger signal (FIG. 7E) to the set inputs of flip-flop 108 (FIG. 6). During the start-up sequence, this initial value is 128 as established by the load signal at the load input LD of 256-bit counter 200 upon the occurrence of each signal PGC'. Thus, for the duration of the output pulse of monostable multivibrator 208, the most significant bit MSB of 256-bit counter 200 occurs at the same time following each occurrence of the signal PGC'.

Figures 12D, 210:

These relationships are shown in FIGS. 12A–12F. When the power is first turned ON, a high signal (FIG. 12B) is applied to input terminal 206 and remains thus throughout operation of the equipment. The output of monostable multivibrator 208 is immediately triggered to the low, or binary "0" condition, and remains so for a predetermined time (FIG. 12C). The output of AND gate 210 (FIG. 12D) remains low until the end of the low cycle in the output of monostable multivibrator 208. Once the output of monostable multivibrator 208 goes high, the D input of D-type flip-flop 212 is enabled, and the next-occurring signal PGC' (FIG. 12A) triggers D-type flip-flop 212 into the set condition to provide signal $FX_1$ (FIG. 12E) to the D input of D-type flip-flop 214. In addition, the enable signal $\overline{FX}_1$ previously applied to an input of AND gate 216 is removed and is replaced with an inhibit signal. Upon the next-occurring signal PGC' (FIG. 12A), D-type flip-flop 214 is triggered into the set condition and applies an enable signal $FX_2$ (FIG. 12F) to an input of AND gate 218 and NAND gate 220. This ends the start-up sequence.

The following paragraphs describe residual error compensator 204.

The signal TJST previously referred to endures for exactly 256 input pulses of clock signal $f_{C2}$. If the content of 256 bit counter 120 (FIG. 6) is less than 127, AND gate 218 is enabled to expand the enabled time of AND gate 226 by one clock pulse $f_{C2}$. Thus, the count in 256-bit counter 200 is incremented by 1 clock pulse in a cycle. Conversely, if the content of 256-bit counter 120 (FIG. 6) is more than 129, NAND gate 220 shortens the time period of signal TJST by one clock pulse $f_{C2}$ thus blocking one clock pulse to 256-bit counter 200 to reduce the content of 256-bit counter 200 by one count per cycle.

An adjustable delay circuit 228 receives the signal PGC' (FIG. 13A) at its input and produces a positivegoing output pulse (FIG. 13B). Adjustable delay circuit 228 is initially adjusted to compensate for fixed delays in the system. In use, the additional automatically adjusted delay provided by residual error compensator 204 compensates for residual phase errors which may develop in time.

A circuit consisting of a set-reset flip-flop 230, a D-type flip-flop 232, a 256-bit counter 234 and an AND gate 236 produce the signal TJST which exactly encompasses 256 cycles of clock signal $f_{C2}$ (FIG. 13C) immediately following the negative going trailing edge of the pulse (FIG. 13B) from adjustable delay circuit 228. Set-reset flip-flop 230 is triggered into the set condition by the negative going trailing edge of the output of adjustable delay circuit 228. The set output of set-reset flip-flop 230 enables the D input of D-type flip-flop 232. The next occurring clock signal $f_{C2}$, applied to the clock input CK of D-type flip-flop 232 triggers this flip-flop into the set condition. The resulting set output of D-type flip-flop 232 (signal TJST) applied to the reset input R of 256-bit counter 234 resets 256-bit counter 234 to zero. In addition, the signal TJST applied to one input of AND gate 236 enables this AND gate to pass the clock pulses $f_{C2}$ to the clock input CK of 256-bit counter 234. The most significant bit output of 256-bit counter 234 is applied to the reset input R of D-type flip-flop 232. In addition, the signal TJST is applied to a reset input R of set-reset flip-flop 230. When 256-bit counter 234 returns to zero after counting exactly 256 cycles of clock signal $f_{C2}$, the most significant bit thereof, applied to the reset input R of D-type flip-flop 232 resets this flip-flop and terminates signal TJST (FIG. 13C). The termination of signal TJST inhibits one input of AND gate 222 and thus halts the gating of clock signal $f_{C2}$ through AND gate 226 by signal TJST. In addition, it inhibits the gating of clock signals $f_{C2}$ through AND gate 236 and resets set-reset flip-flop 230. Thus, 256-bit counter 234 is cycled from zero through one complete cycle and stops again at zero.

A decoder 238, which receives the bit conditions of 256-bit counter 234 provides an output TEND during the last period of clock signal $f_{C2}$ before 256-bit counter 234 returns to zero. The signal TEND is applied to an input of NAND gate 220. As can be seen in FIGS. 13D and 13C, signal TEND has a width equal to one cycle of clock signal $f_{C2}$ and occurs just within the end of the time defined by signal TJST.

A monostable multivibrator 240 is triggered by the end of signal TJST to produce an output pulse TNXT which has the same width as one cycle of clock signal $f_{C2}$ and which is applied to an input of AND gate 218. As can be seen in FIGS. 13C and 13E, signal TNXT is located just outside the end of the time defined by signal TJST.

A circuit consisting of a decoder 242 and two D-type flip-flops 244 and 246 determine whether 256-bit counter 200 continues to cycle at the same time relative to the arrival of signal PGC' or is advanced or retarded from that time. The bit conditions of 256-bit counter 120 (FIG. 6) are applied to decoder 242. When the count in counter 120 is 127, 128 or 129 at the occurrence of signal $\overline{FF22}$ from flip-flop 108 (FIG. 6), both outputs from decoder 242 to the D inputs of D-type flip-flops 244 and 246 are "0" and both D-type flip-flops 244 and 246 remain in reset condition. Thus, AND gate 218 and NAND gate 220 are inhibited by the "0" signals applied to their inputs from D-type flip-flops 244 and 246 respectively. The resulting "1" output of NAND gate 220 enables one input of AND gate 222. Upon the next occurrence of signal PGC', signal TJST is transmitted unmodified through AND gate 222 and OR gate 224 to an input of AND gate 226. Thus, clock pulses $f_{C2}$ are transmitted through AND gate 226 to 256-bit counter 200 for exactly the period of signal TJST. During signal TJST, exactly 256 cycles of clock signal $f_{C2}$ are received and 256-bit counter 200 is cycled from an original condition and returned to the same condition at the end of signal TJST.

If the content of 256-bit counter 120 (FIG. 6) is 130 or more at the occurrence of signal $\overline{FF22}$, a "1" is applied to the D input of D-type flip-flop 246 and this flip-flop is triggered into the set condition by signal $\overline{FF22}$, thus providing a "1" to an input of NAND gate 220. The signal TEND from decoder 238 (FIG. 13B), which coincides with the last clock pulse of clock signal $f_{C2}$ in signal TJST, enables the last input of NAND gate 220 and thus produces a "0" at its output which is applied to an input of AND gate 222 at this time. Since AND gate 222 is inhibited it, in turn, inhibits an input of AND gate 226 and suppresses the last occurring clock pulse $f_{C2}$ during TJST. Thus, instead of 256-bit counter 200 counting exactly 256 pulses and returning to the same value during signal TJST, it counts 255 pulses and its content is retarded by one count. Accordingly, following the next arrival of signal PGC', the time at which 256-bit counter 200 returns to zero and produces a signal MSB for application to the set input S of flip-flop 108 occurs one cycle of clock signal $f_{C2}$ later during signal TJST than it did in the preceding cycle. Thus, flip-flop 108 (FIG. 6) produces signal FF22 one clock cycle later in the phase measurement operation and one less clock pulse $f_{C2}$ is gated through AND gate 110 into the clock input CP of 256-bit counter 120 before the arrival of the phase reference signal at input 102 applied to the reset input R of flip-flop 108 terminates the accumulation of phase error. Thus, at the end of this phase measurement cycle, the content of 256-bit counter 120 is one less than it was in the preceding cycle. If the content of 256-bit counter 120 continues to exceed 129 after the 1 count correction outlined in the preceding, additional adjustment of the count in 256-bit counter 200 (FIG. 11) is performed one count per measurement cycle until the content of 256-bit counter 120 falls within the range of 128 plus or minus one.

If the count in 256-bit counter 120 is less than 127 at the occurrence of signal $\overline{FF22}$, the D input of D-type flip-flop 244 is enabled by decoder 242 and D-type flip-flop 244 is triggered into the set condition upon the arrival of signal $\overline{FF22}$. The set output thereof applies a "1" to an input of AND gate 218. Upon the arrival of the next signal PGC', monostable multivibrator 240 produces signal TNXT (FIG. 13E) following the end of signal TJST (FIG. 13C), which is connected through AND gate 218 and OR gate 224 to an input of AND gate 226. This extends the enablement of AND gate 226 for one additional cycle of clock signal $f_{C2}$. Thus, 256-bit counter 200 counts 257 pulses of clock signals $f_{C2}$ rather than 256 pulses and comes to rest containing one more count than it contained at the beginning of the cycle. Since 256-bit counter 200 now contains a higher count, following the next arrival of signal PGC', it generates signal MSB one cycle of clock signal $f_{C2}$ sooner than it did in the preceding cycle. This has the effect of increasing the number of counts stored in 256-bit counter 120. This process is continued one count per measurement cycle until the count in 256-bit counter 120 falls within the acceptable region.

Although the above-described preferred embodiment employs varying the delay of an effectiveness time for signal PGC', it would be clear to one skilled in the art that the same result could be obtained by varying the effective time of the phase reference signal applied to input terminal 102. In addition, although a nominal value of 128 plus or minus 1 is maintained in 256-bit counter 120, any other suitable nominal value may be maintained therein by an appropriate change in the operation of decoder 242.

Having described specific preferred embodiments of the invention with reference to the accompanying drawings, it is to be understood tha the invention is not limited to those precise embodiments, and that various changes and modifications may be effected therein by one skilled in the art without departing from the scope or spirit of the invention as defined in the appended claims.

What is claimed is:

1. A servo control apparatus for controlling rotation of a rotary member comprising:
   means for driving said rotary member;
   means for generating an angular position signal related to an angular position of said rotary member;
   means for generating a reference signal related to a desired angular position of said rotary member;
   means for detecting a time interval related to a time between said angular position signal and said reference signal;
   means for controlling said means for driving in accordance with said detected time interval whereby phase control of said rotary member is achieved; and
   means for eliminating residual phase errors by changing a timing of one of said angular position signal and said reference signal in response to said detected time interval.

2. A servo control apparatus according to claim 1; wherein said means for eliminating residual phase errors by changing a timing includes means for delaying at least one of said angular position signal and said reference signal.

3. A servo control apparatus according to claim 1; wherein said means for eliminating residual phase errors by changing a timing includes variable delay means for delaying said angular position signal.

4. A servo control apparatus according to claim 1; in which said means for detecting accumulates a digital number which corresponds to said detected time interval, said means for controlling controls said means for driving in accordance with said digital number, and said means for eliminating residual phase errors by changing changes a timing of one of said angular position signal and said reference signal in response to said digital number whereby said digital number is changed toward a predetermined value.

5. A servo control apparatus according to claim 4; wherein said means for eliminating residual phase errors by changing a timing includes decoder means for detecting a condition of said digital number.

6. A servo control apparatus according to claim 5; wherein said decoder means is effective to produce a first output if said digital number exceeds a first value and to produce a second output if said digital number is less than a second value lower than said first value.

7. A servo control apparatus according to claim 6; wherein said means for eliminating residual phase errors by changing a timing further includes means responsive to said first and second outputs effective to change said digital number toward a value between said first and second values.

8. A servo control apparatus according to claim 1; wherein said means for eliminating residual phase errors by changing a timing includes means for preventing changing said timing for a predetermined time after said servo control apparatus is turned ON.

9. A servo control apparatus for controlling rotation of a rotary member comprising:
   means for driving said rotary member;
   means for generating an angular position signal related to an angular position of said rotary member;
   means for generating a reference signal related to a desired angular position of said rotary member;
   means for detecting a time interval related to a time between said angular position signal and said reference signal, wherein said means for detecting accumulates a digital number which corresponds to said detected time interval;
   means for controlling said means for driving in accordance with said digital number which corresponds to said detected time interval whereby phase control of said rotary member is achieved; and
   means for changing a timing of one of said angular position signal and said reference signal in response to said digital number which corresponds to said detected time interval whereby said digital number is changed toward a predetermined value, said means for changing a timing including:
   means for generating cycles of a clock signal;
   counter means for counting said cycles and for producing an output signal upon attaining a predetermined condition;
   said means for detecting a time interval being responsive to said output signal for beginning said accumulating and to said reference signal for terminating said accumulating;
   means for decoding said digital number and for producing a first signal if it is greater than a first value, and for producing a second signal if it is less than a second value which is smaller than said first value; and
   means for changing a content of said counter means a predetermined amount in a first direction in response to said first signal and said predetermined amount in a second direction in response to said second signal whereby a time of attaining said predetermined condition is changed and said digital number is also changed.

10. A servo control apparatus according to claim 9; wherein said predetermined amount is one count.

11. A servo control apparatus according to claim 9; wherein said time of attaining said predetermined amount is changed by a time substantially equal to one of said cycles.

* * * * *